(12) United States Patent
Biebach

(10) Patent No.: US 11,021,224 B2
(45) Date of Patent: Jun. 1, 2021

(54) DEVICE FOR PROVIDING ELECTRICAL POWER FOR AN ELECTRICAL CONSUMING DEVICE AND/OR FOR CHARGING A BATTERY IN A BOAT

(71) Applicant: Torqeedo GmbH, Gilching (DE)

(72) Inventor: Jens Biebach, Tutzing (DE)

(73) Assignee: Torqeedo GmbH, Gilching (DE)

( * ) Notice: Subject to any disclaimer, the term of this patent is extended or adjusted under 35 U.S.C. 154(b) by 279 days.

(21) Appl. No.: 15/876,027

(22) Filed: Jan. 19, 2018

(65) Prior Publication Data

US 2018/0208290 A1  Jul. 26, 2018

(30) Foreign Application Priority Data

Jan. 20, 2017  (DE) .................... 10 2017 101 145.5

(51) Int. Cl.
| | | |
|---|---|---|
| *B63J 99/00* | (2009.01) | |
| *B63H 23/24* | (2006.01) | |
| *B60L 50/10* | (2019.01) | |
| *B60L 53/24* | (2019.01) | |
| *B60L 15/20* | (2006.01) | |
| *B63H 21/20* | (2006.01) | |

(Continued)

(52) U.S. Cl.
CPC ........... *B63J 99/00* (2013.01); *B60L 15/2045* (2013.01); *B60L 50/10* (2019.02); *B60L 53/24* (2019.02); *B63H 21/20* (2013.01); *B63H 23/24* (2013.01); *B60K 2006/268* (2013.01); *B60L 2200/32* (2013.01); *B60L 2220/20* (2013.01); *B60Y 2400/47* (2013.01); *B63B*

*79/00* (2020.01); *B63H 2021/205* (2013.01); *Y02T 10/64* (2013.01); *Y02T 10/70* (2013.01); *Y02T 10/7072* (2013.01); *Y02T 10/72* (2013.01); *Y02T 90/16* (2013.01)

(58) Field of Classification Search
CPC combination set(s) only.
See application file for complete search history.

(56) References Cited

U.S. PATENT DOCUMENTS 3,619,632 A * 11/1971 Labombarde .......... B63H 20/00
                                                                  290/43
6,530,359 B1    3/2003 Steffen
(Continued)

FOREIGN PATENT DOCUMENTS

CN        105151261 A   12/2015
DE   10 2008 049 225 A1    4/2010
(Continued)

OTHER PUBLICATIONS

Japanese Office Action issued in Japanese counterpart application No. 2018-008023 dated Aug. 13, 2019, with English translation (Six (6) pages).

(Continued)

*Primary Examiner* — Hussein Elchanti
(74) *Attorney, Agent, or Firm* — Crowell & Moring LLP

(57) ABSTRACT

A system for operating a boat equipped with an electric drive includes a component controller. The component controller includes a component interface for connecting a system component of the electric drive, and a communication interface for connecting the component controller to a system bus of the drive control.

17 Claims, 3 Drawing Sheets

(51) Int. Cl.
*B60K 6/26* (2007.10)
*B63B 79/00* (2020.01)

(56) References Cited

U.S. PATENT DOCUMENTS

| | | | | |
|---|---|---|---|---|
| 6,986,688 | B1* | 1/2006 | Jansen | B63H 20/007 440/1 |
| 7,306,496 | B1* | 12/2007 | Carmen | B63H 20/007 440/1 |
| 7,646,178 | B1* | 1/2010 | Fradella | H02K 1/2793 322/22 |
| 8,083,557 | B2* | 12/2011 | Sullivan | B60F 3/0007 290/54 |
| 9,028,285 | B2* | 5/2015 | Tamba | B63H 21/20 440/3 |
| 9,174,524 | B2 | 11/2015 | Katsumata et al. | |
| 2011/0237141 | A1 | 9/2011 | Tamba | |
| 2012/0016549 | A1 | 1/2012 | Katsumata et al. | |
| 2012/0205986 | A1* | 8/2012 | Frampton | H02J 3/46 307/84 |

FOREIGN PATENT DOCUMENTS

| | | |
|---|---|---|
| EP | 2 243 699 A1 | 10/2010 |
| EP | 2 433 841 A1 | 3/2012 |
| GB | 2 417 378 A | 2/2006 |
| JP | 2002-524690 A | 8/2002 |
| JP | 2006-14524 A | 1/2006 |
| JP | 2010-173390 A | 8/2010 |
| JP | 2011-10535 A | 1/2011 |
| JP | 2014-40242 A | 3/2014 |
| WO | WO 2016/084799 A1 | 6/2016 |

OTHER PUBLICATIONS

English machine translation of previously cited B5 (Twenty Four (24) pages).
English machine translation of previously cited B7 (Twenty Six (26) pages).
German Office Action issued in German counterpart application No. 10 2017 101 145.5 dated Jan. 9, 2018 (Six (6) pages).
Japanese Office Action issued in Japanese counterpart application No. 2018-008023 dated Jan. 29, 2019, with partial English translation (Ten (10) pages).
European Search Report issued in European counterpart application No. 18152705.2-1205 / 3351472 dated Sep. 24, 2018, with Statement of Relevancy (Eleven (11) pages).
Zhang et al., "Integrated Design of Powertrain Controllers in Series Hybrid Electric Vehicles for Efficiency Enhancement and Battery Lifetime Extension", World Electric Vehicle Journal, vol. 3, No. 4, Dec. 25, 2009, pp. 843-848 (Six (6) total pages), XP055506914.
Chinese Office Action issued in Chinese counterpart application No. 201810061001.5 dated May 7, 2019, with partial English translation (Twelve (12) pages).
Chinese Office Action issued in Chinese application No. 201810061001.5 dated Jan. 8, 2020 with partial English translation (Nine (9) pages).
German-language European Office Action issued in European application No. 18152705.2-1205 / 3351472 dated Oct. 20, 2020 (Ten (10) pages).
Anonymous: "Lichtmaschine—Wikipedia", Jan. 3, 2017, XP055677285, URL:https://de.wikipedia.org/w/index.php?title=Lichtmaschine &oldid=161218437 (Eight (8) total pages).

* cited by examiner

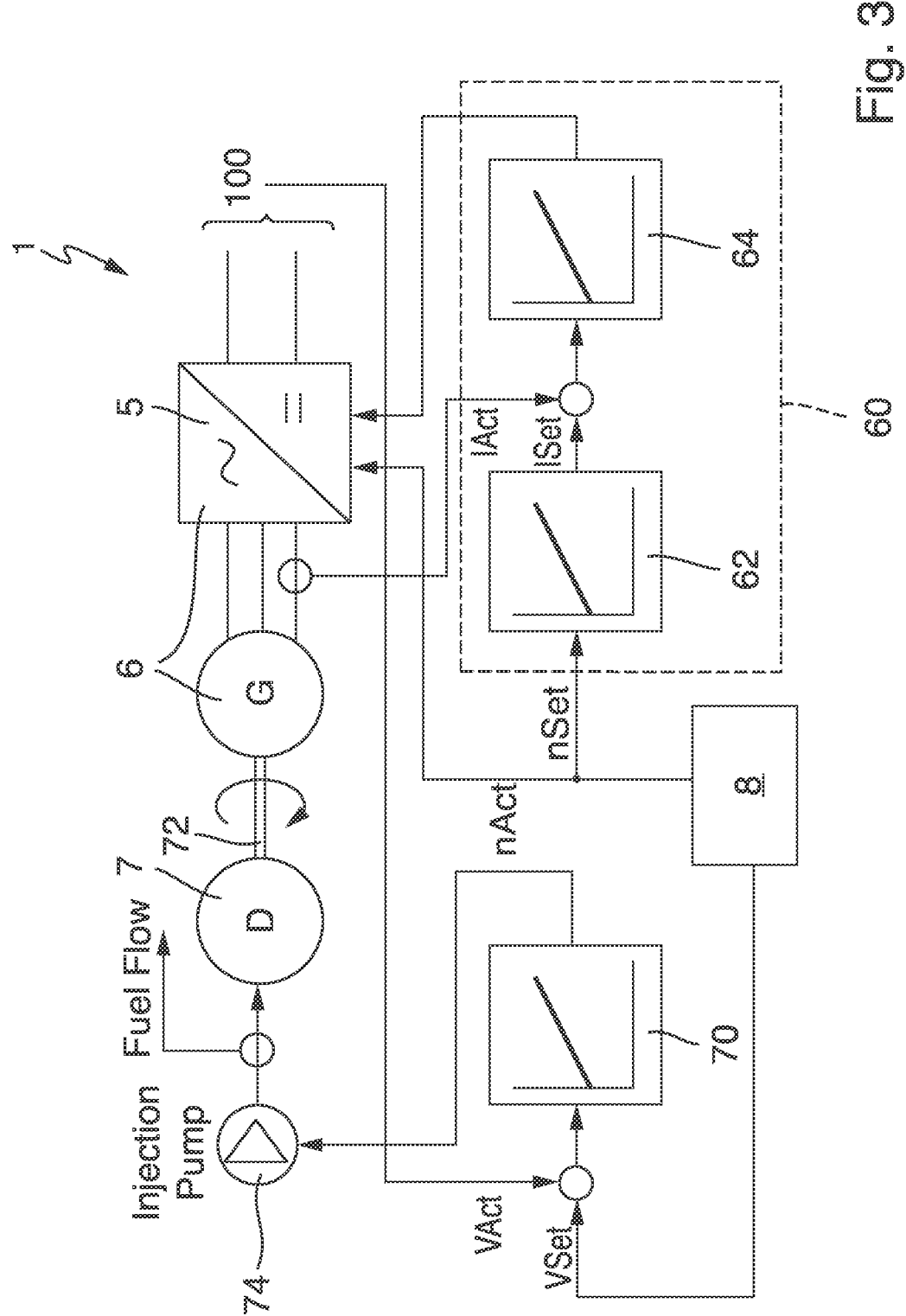

DEVICE FOR PROVIDING ELECTRICAL POWER FOR AN ELECTRICAL CONSUMING DEVICE AND/OR FOR CHARGING A BATTERY IN A BOAT

CROSS REFERENCE TO RELATED APPLICATIONS

This application claims priority to German Patent Application No. DE 10 2017 101 145.5, filed Jan. 20, 2017, the disclosure of which is expressly incorporated by reference herein.

FIELD OF THE INVENTION

The present invention relates to a device for providing electrical power for an electrical consuming device and/or for charging a battery in a boat driven by an electric motor.

BACKGROUND OF THE INVENTION

It is known to power boats with an electric drive and, in this regard, fundamentally different installation types for the electric motor are known. Furthermore, in addition to the installation types of an electric motor which are known in the domain of internal combustion engines, directly on the shaft system of the propeller shaft in the interior of the boat or the installation of the electric motor in the interior of the boat on a Z-drive or a sail drive, installation types are also known in which the electric motor is arranged outside the hull of the boat, for example, in the form of outboard engines or under the hull in a drive gondola or pod drives provided on the rudder system.

For provision of electrical power in an on-board electrical system of a boat it is known to provide a generator which is driven by means of a combustion engine. In this case, depending upon requirements, direct current generators or alternating current generators are used, which supply the on-board electrical system appropriately with electrical power.

Since major fluctuations in the power demand can occur after loading of the on-board electrical system by different electrical consuming devices, in conventional devices for providing electrical power in a boat having a generator driven by a combustion engine it can occur that the combustion engine is not operated at its optimal operating point and accordingly the efficiency of the conversion of the fuel into electrical power drops.

This is the case in particular when the generator connected to the combustion engine in the boat is used to charge or to recharge accumulators or batteries within the on-board power network. During charging of batteries, after the main charging phase, in which the charging is operated with a constant (maximum) current, in a recharging phase it occurs that the charging is carried out at a constant nominal charging voltage and the current drops more and more. If for this purpose the electrical power is provided by means of a generator, the generator is operated in a low-efficiency range.

As a solution, GB 2 417 378 A proposes a generator-powered battery charger, wherein the rotational speed of the combustion engine is controlled so that the generator sequentially supplies charging current pulses to the battery to be charged. Accordingly, only the speed of the combustion engine is controlled in order to vary the charging current which is generated by the direct current generator. However, due to the necessary variation of the speed the combustion is only rarely operated at its maximum efficiency.

SUMMARY OF THE INVENTION

It is an object of the present invention to provide a device for providing electrical power for an electrical consuming device and/or for charging a battery in a boat, which device provides a further improved layout.

Advantageous further embodiments are apparent from the present description and the drawings.

Accordingly a device is provided for providing electrical power for an electrical consuming device and/or for charging a battery and/or battery bank for an electric motor-powered boat, wherein the device comprises a combustion engine having an engine regulator for regulating the combustion engine and also having a direct current generator which is coupled to the combustion engine and has a generator regulator for regulating the direct current generator, wherein a control device is provided which is configured to set an engine reference variable for the engine controller and/or a generator reference variable for the generator controller.

Because the combustion engine has an engine regulator for regulating the combustion engine on basis of an engine reference variable and the generator likewise has a generator regulator for regulating the generator on the basis of a generator control variable, it is possible to regulate both the generator and also the combustion engine to a certain extent independently of one another and in this way to make the provision of electrical energy even more efficient.

In particular by means of the control device it is possible to set the corresponding engine reference variables and generator reference variables for the combustion engine and the generator so that having regard to the respective structure of the device and the characteristics of the respective components a particularly efficient operation can be achieved and simultaneously the electrical power can be reliably provided in the required form.

In this case, by means of the regulation of the generator with the aid of a generator reference variable it is possible for example that the voltage in the on-board electrical system which is provided by the generator or the current in the on-board electrical system which is provided by the generator can be kept constant according to the set values, without having to take the behavior of the combustion engine into consideration within certain limits.

Furthermore, in the same context an efficient operation of the combustion engine can also be achieved at a set operating point—for example at its highest efficiency—and the generator regulation nevertheless ensures that the required voltage or the required current is present in the on-board electrical system.

Preferably the control device supplies the engine regulator with, as engine reference variable, a power setting and/or an operating point setting and/or a speed setting and/or a torque setting, and/or the control device preferably supplies the generator regulator of the generator with, as generator reference variable, a voltage setting and/or a current setting and/or a power setting and/or a battery current setting and/or a battery voltage setting and/or a battery power setting and/or an intermediate circuit voltage setting and/or an intermediate circuit current setting and/or an intermediate circuit power setting.

In this way the combustion engine and the generator can be regulated independently of one another with different reference variables or settings within a certain range, so that a particularly efficient operation can be achieved.

In a further preferred embodiment the control device supplies the engine regulator with, as engine reference variable, a voltage setting and/or a current setting and/or a power setting and/or a battery current setting and/or a battery voltage setting and/or a battery power setting and/or an intermediate circuit voltage setting and/or an intermediate circuit current setting and/or an intermediate circuit power setting, and/or the control device preferably supplies the generator regulator with, as generator reference variable, a power setting and/or and operating point setting and/or a speed setting and/or a torque setting.

This mode of operation can be advantageous in particular if, because of the configuration or the dimensioning of the combustion engine, an exact maintenance or regulation of the speed of the combustion engine is difficult. Then for example by means of a torque setting of the generator the speed of the generator can be kept constant and accordingly can be quickly adjusted, and the combustion engine is regulated for the respective voltage or the respective current or the respective power as setting, so that the interaction results in an improved regulation and thus an increased efficiency as well as a more stable on-board electrical system.

Accordingly, by the use of the regulating unit of the generator it is possible to operate the generator largely independently of the input speed by the combustion engine in its optimal range for the respective setting parameter, that is to say for example the current setting, the voltage setting or the power setting, and to reliably provide the on-board voltage or a charging curve for the battery bank according to the respective parameters.

In at least one embodiment the direct current generator is an electronically commutated direct current generator and the generator regulator is configured to adjust the direct current generator by means of a variation of the generator manipulated variable for generator torque and/or generator current and/or generator voltage and/or generator speed and/or generator power on the respective generator reference variable.

By means of a variation of the engine manipulated variable for fuel delivery and/or injection valve control and/or ignition timing and/or mixture composition and/or air supply and/or camshaft adjustment and/or turbocharger control, the engine regulator of the combustion engine preferably effects adjustment of the combustion engine to the respective engine reference variable.

For example, by means of the control device a corresponding speed setting can be supplied to the engine regulator, and the engine regulator then regulates the speed according to the speed setting by a variation of the fuel delivery to the combustion engine. Thus the combustion engine can be operated in a largely stable manner at the set speed.

A particularly compact and thus efficient layout can be achieved if the generator regulator and/or the engine regulator of the combustion engine and/or the control device are integrated in a central controller.

The control device preferably comprises, for example, characteristics and/or values stored in a database for the engine reference variable and/or the generator reference variable and the control device supplies the engine regulator and/or the generator regulator with a stored value or a value derived from a characteristic for the engine reference variable and/or the generator reference variable. A value of the engine reference variable for operation of the combustion engine at maximum efficiency or at maximum power is preferably set and/or a value of the generator reference variable is preferably set according to a characteristic which sets a battery charging curve.

The control device selects the corresponding setting, for example the speed setting, on the basis of the respective demand in the on-board electrical system or during the charging operation of a battery bank.

Simultaneously or alternatively the control device can supply the generator regulator with a corresponding setting, for example a current setting, a voltage setting or a power setting—depending upon how the subsequent on-board electrical system or the charging curve for a battery bank should look.

Accordingly the combustion engine and the generator are regulated on the basis of different setting signals, for example the generator is regulated on the basis of a battery current setting, battery voltage setting, or battery power setting and the combustion engine is regulated by means of a speed setting.

In an alternative the combustion engine can also be regulated according to a battery current setting, battery voltage setting, or battery power setting and the generator can be regulated by means of a speed setting.

In at least one embodiment the control device monitors the on-board electrical system or the intermediate circuit and varies the predetermination parameters for the generator regulator and/or the engine regulator according to the state of the on-board electrical system or of the intermediate circuit. For example, in the event of a high power requirement in the on-board electrical system, the speed setting for the combustion engine of a most efficient operating point can be set towards an operating point of the maximum power. Then for the generator the corresponding power requirement is set so that the on-board electrical system continue to be operated in a stable manner.

It may also be preferable that a current setting for charging a battery bank is set by the control device, and the control device monitors the respective state of charge of the battery bank and accordingly, upon reaching the set charging voltage in the battery bank, changes from a maximum current setting to a constant voltage setting. Thus the generator regulation is adapted over the course of charging the battery bank so that the corresponding current curve or the corresponding voltage curve facilitates optimal charging of the battery, wherein simultaneously the combustion engine is likewise optimized but is regulated independently thereof.

Accordingly in this way a charging device is also produced, in which the combustion engine in combination with the generator provides an optimized charging curve for a battery bank.

In at least one embodiment this charging curve provided for the battery bank in an on-board electrical system buffered by means of the battery bank can be superimposed on the power requirement of the other consuming devices within the on-board electrical system. In other words, in addition to the provision of the power within the on-board electrical system for the currently active consuming device the charging current is superimposed so that an optimized charging of the battery bank is additionally achieved.

Furthermore, in a battery-buffered on-board electrical system with a fully charged battery bank the generator can be operated together with the combustion engine so that neither discharging nor charging of the battery takes place, but the battery keeps its state of charge constant so long as the combustion engine is operated. In this way it is possible for the most part to dispense with interim buffering by the battery, so that likewise the efficiency of the on-board electrical system increases since the buffering losses drop.

The combustion engine preferably has an electronic engine controller and accordingly the engine regulator carries out the regulation of the combustion engine by means of the electronic engine controller.

In at least one embodiment the combustion engine has a mechanical speed regulator as engine regulator and the mechanical speed regulator receives from the control device an engine reference variable in the form of a speed setting by means of a mechanical and/or pneumatic and/or hydraulic actuator for adjustment of the mechanical speed regulator. In this way simple combustion engines can also be used in the device.

The direct current generator is preferably provided as starter motor for the combustion engine, wherein as generator reference variable a speed setting is preferably supplied to the generator regulator and particularly preferably after starting of the combustion engine the generator reference variable is retained.

Accordingly it may be noted that a working point of the combustion engine can be set in wide ranges independently of the respective regulation tasks of the generator, since the generator is controlled autonomously. In this way the said optimization strategies can be implemented so that, on the basis of the combination of the regulation of the combustion engine and the regulation of the generator substantially independently thereof, the corresponding provision of power in the on-board electrical system or for charging is made possible in a particularly efficient manner.

A system with a simplified design and increased reliability is provided through a system having features of embodiments disclosed herein.

A system for operating a boat equipped with an electric drive comprises a component controller which comprises a component interface which is configured to connect a system component of the electric drive and a communication interface which is configured to connect the component controller to a system bus of a drive control.

In that the component controller comprises a component interface for connecting a system component of the electric drive and a communication interface for connecting the component controller to a system bus, the component controller effectively functions as an intermediate member between the specific physical system components which can be, for example, a battery, an electric motor, a generator, a converter or an internal combustion engine drive, and the system bus.

Thus, the specific system components are in communication with the system bus of the drive control only via the component controller, whereas a direct communication of the system components with the system bus does not take place. Thus, the system bus of the drive control can be configured clearly defined, robust and reliable. An adaptation of the system bus on an exchange of system components is correspondingly not necessary. The respective component controller connected to the system components is connected therebetween and, in each case, assumes the translation and preparation of the signals, states and data communication of the specific system components for the system bus. Furthermore, a decoupling of the system components from the system bus takes place so that defects in individual system components cannot disrupt the system bus.

The system for operating a boat equipped with an electric motor should be understood, in particular, as one which comprises and puts into relation with one another system components necessary at least for the driving of the boat. For the driving of a boat equipped with an electric motor, apart from the actual drive comprising the electric motor with a propeller or a jet drive, an energy supply for the electric motor is also provided which can be provided in the form of a battery, but also in the form of a generator. Such a system further comprises an input unit for defining a desired drive level by the operator of the system.

Apart from the aforementioned system components that are necessary for the actual driving, a system for operating a boat equipped with an electric motor can also comprise further auxiliary system components, such as charging devices for charging a battery, DC/DC converters, DC/AC converters, generators and a plurality of auxiliary consumers such as communication devices, navigation lights, navigation devices, entertainment devices, illumination, kitchen appliances, cooling devices, etc.

Particularly preferably, the component controller comprises an abstraction module by means of which a specific component of the electric drive connected to the system interface is represented on the communication interface as a generic system component.

By means of the abstraction module, the component controller enables the respective specific system components to be abstracted to a generic level, so that the system component can easily be detected, addressed and controlled by a higher-level drive control or system control.

A generic system component should be understood as such which comprises the control and state parameters necessary for operating the system as well as data communication and/or control commands in a general form without having to take account of the specific technical parameters of the connected system component.

For example, in the case of a battery or battery bank, a switch-on signal for the system start may be necessary as a control parameter. On the generic components, only the command "Switch On" is present—the component-specific implementation is then undertaken by the component controller on the basis of the specific properties of the battery or battery bank connected via the component interface. If the command is received accordingly at the communication interface via the system bus to switch on the battery bank on a system start, then the component controller converts this command, dependent upon the battery connected to the component interface in that with a first battery type, for example, a 12 V ignition signal is transferred, with a second battery type, a 24 V ignition signal is transferred and with a third battery type, a pulse is transferred to switch a load relay.

As a state parameter, for example, a charging state can be transferred from the battery to the component controller which then provides at the communication interface, for example abstracted, a percentage charging state or an actual residual capacity.

Thus, all the system components of one system component type connected to the component controller behave equally. In other words, at the communication interface, a generic battery is always displayed and addressed the same, regardless of the actual technical manifestation of the battery.

As a further example, an electric motor can be provided with which as a generic electric motor, for example, only one drive level can be transferred as a drive command. Accordingly, the drive command, e.g. "Half ahead", "Full ahead", "Full reverse" or a percentage drive command, e.g. "80% ahead", "20% reverse", is transferred from a higher-order drive control via the system bus, said command then being converted in the component controller into a corresponding rotary speed stipulation, torque stipulation or power stipulation for the specific electric motor connected to the component interface and being converted into a control command according to the respective power electronics connected to the component interface.

In the case of an electric motor, for example, state parameters such as the temperature, preferably a percentage temperature relative to a maximum temperature permissible for the specific electric motor connected via the component interface are also transferred at the communication interface. A higher-order drive control can correspondingly read out the current percentage temperature loading, regardless of the absolute thermal loading capacity of the specific electric motor.

In other words, a higher-order control system which communicates with the component controller via the system bus can address a system component connected to the component controller via the component interface directly and generally without having to take account of technical peculiarities or particular specifications of the specific system components. Equally, the higher-order control system only receives state parameters and data communication in a generic format.

Accordingly, even on an exchange of system components—for example, the installation of a more powerful motor or the exchange of the battery bank for a battery bank with greater capacity—no change need be made to the higher-order control system and the overall system can be constructed as easy to maintain and scalable.

Preferably, at least two different system components can be alternatively connectable to a single component interface and the component controller can be configurable, dependent upon the system component connected, such that the respective specific system component connected is represented as a generic system component.

Thus, system components, for example, a battery or an electric motor can be connected alternatively to one component controller. In other words, if a battery is connected to the component interface of the component controller, a generic battery can be represented at the communication interface and if, in place of the battery, an electric motor is connected to the component interface of the same component controller, a generic electric motor can be represented at the communication interface. Thus, by means of a single of type of component controller, depending on the system component connected to the communication interface, in each case a corresponding generic system component can be represented and it is not necessary to provide a specific component controller for each type of system component. Only the component controller is adapted to the specific system component connected thereto in that the corresponding parameters are updated. In other words, an initialization of the component controller takes place in that the component controller is adapted to the respective system component connected to the component interface—by means of a corresponding parameterization and/or by means of the use of corresponding conversion tables for the data communication and/or by means of a corresponding internal wiring.

Thus, the possibility exists in the overall system of the boat to provide identical component controllers for connection to a plurality of different or even all types of system components. Thus, the number of possible identical parts within the system is greater, which also has an advantageous effect on the serviceability and the costs.

In this way, it is also possible to exchange system components and/or component controllers against one another, for example, on occurrence of a defect without having to intervene in the higher-level control system. The system controller further controls the generic components represented by means of the component controller.

In the event of a defect in a component controller on the component interface of which the electric motor is arranged, the electric motor can be disconnected, for example, from the defective component controller and connected to a functioning component controller which is not essential for pure vehicle operation—for example, to a component controller to the component interface of which the charging device of the shore connection is connected. Thus, in an emergency situation at sea, the vehicle operation can accordingly be maintained even with a defective component interface.

In that the component controller can, in principle, be connected to any desired system components, for example, to a battery or to the power electronics of an electric motor of the electric drive or a charging device for charging the battery or a generator for charging the battery and the component controller provided therefore are always identically designed, apart from the simplified configuration of the programming of a higher-order control system, an efficient design of the device can also be provided. Furthermore, in this way, redundancies in the system can be built up such that on failure of a component controller, another component controller can take its place.

In this way, it is possible to maintain the driving function of the boat and thus the maneuvering capability and, in this way, to construct a redundant and secure system.

Preferably, a connection unit controller is provided which communicates with the component controller via the system bus and by means of which the component controller receives drive commands. Particularly preferably, the connection unit controller communicates with an input device, for example, a remote throttle lever to specify a drive level by means of an operator and the connection unit controller controls the predetermined drive level according to one or more component controllers via the system bus in order to achieve the pre-determined drive level.

Preferably, the connection unit controller combines at least two component controllers into an organizational connection unit, in particular as a core system and controls the underlying drive functions.

Preferably, the connection unit controller communicates with a device for specifying a desired drive level, for example, with a remote throttle lever, by means of which, accordingly, the respective drive level of the electric drive is specified. Thus, by means of a direct communication between the remote throttle lever and the connection unit controller, the connection unit controller can control the respective components represented as generic system components by the component controller with regard to the underlying drive functions.

For example, by means of a drive command pre-determined by the user by means of the remote throttle lever and transferred to the connection controller, the connection unit controller can transfer the drive command via the system bus and the communication interface directly to the addressed component controller.

The connection unit controller can accordingly be used, firstly, for the organization of the connection unit and, secondly, for processing the respective drive commands, so that here short reaction times and, in particular, also short system start times can be achieved. Rapid booting up of the system and conversion of a drive command is significant particularly when, during maneuvering of the boat, a rapid reaction is needed, for example, in a suddenly occurring emergency stop situation in which an emergency stop maneuver must be carried out or if other maneuver functions are significant.

It is accordingly possible, without involvement of a system controller or even a whole-boat network, to transfer the drive commands immediately and directly by means of the transfer of the respective drive commands or drive level wishes from the remote throttle lever to the connection unit controller and from this via the internal communication bus within the connection unit to the respective component controllers. Thus, the maneuverability of the boat can be provided rapidly and robustly sustained.

In a preferred development, the system controller is configured by means of a corresponding initialization also to serve as a connection unit controller. Thus, a separate connection unit controller can be dispensed with and the number of identical parts in the system can be further increased.

Preferably, the component controllers and the connection unit controller are structurally integrated into one housing which is designated a connection unit. In the connection unit which accordingly consists of a connection unit controller and a plurality of component controllers, a communication takes place between the communication interface of the component controller and the communication interface of the connection unit controller via a system bus which is provided within the connection unit. A system bus can be, for example, a bus which communicates via a known protocol, for example a CANopen bus or another standardized protocol. However, a proprietary protocol can also be used.

Each component controller as well as each connection unit controller and also each system controller comprises its own microprocessor by means of which the corresponding applications can be processed and by means of which the communication via the corresponding buses can be handled.

In the system, also, at least two connection units, can each be provided with at least one component controller, a connection unit controller and a system controller and the system controllers of the connection units then communicate with one another wherein one system controller then functions as a master system controller and all the other system controllers are operated as slave system controllers.

In this way, a distributed system can be provided in the boat, wherein, for example, on provision of an electric drive with more than one electric motor, a connection unit is associated with each electric motor and the battery banks associated with each electric motor. A further connection unit can be provided, for example, for a generator spaced apart from the electric motors. The battery banks, when they are arranged spaced from the electric motors associated with them in the boat can also be provided with their own connection unit. By means of the communication of the system controllers of the individual connection units among one another, such a distributed system can also be designed as easily scalable and easily serviceable.

In at least one embodiment, the component controller is configured to detect, on the basis of the system components connected via the component interface, which system component is actually connected and accordingly to carry out an initialization according to the respective specific system component.

Other objects, advantages and novel features of the present invention will become apparent from the following detailed description, taken in conjunction with the accompanying drawings, which illustrate, by way of example, the principles of one or more preferred embodiments.

BRIEF DESCRIPTION OF THE DRAWINGS

FIG. 3 shows a schematic representation of a further on-board system having a layout in which a voltage setting is provided as an engine reference variable.

DETAILED DESCRIPTION OF THE DRAWINGS

Figure 1:
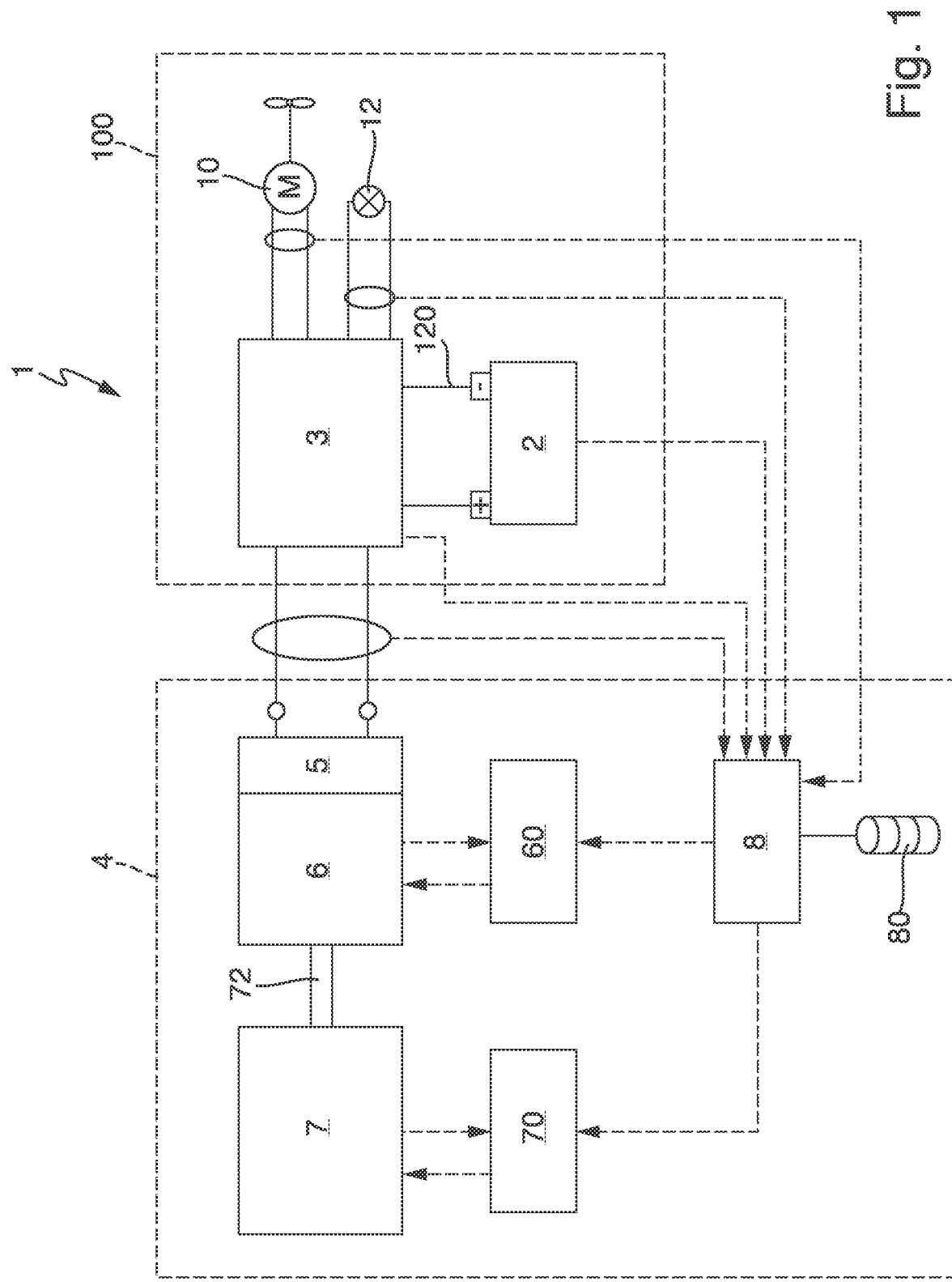
FIG. 1 shows a schematic representation of an on-board system in an electrically powered boat, showing an on-board electrical system and a device for providing electrical power.

Several embodiments are described below with reference to the drawings. In this case elements which are the same, similar, or act in the same way are provided with identical reference numerals in the different drawings, and repeated description of some of these elements is omitted in order to avoid redundancies.

In FIG. 1 the layout of an on-board system 1 in an electrically powered boat is shown very schematically. The on-board system 1 comprises an on-board electrical system 100 of the boat and a device 4 for providing electrical power in the on-board electrical system 100. The device 4 for providing electrical power of the on-board system 1 is provided inter alia in to supply electrical power both to individual consuming devices 10, 12 in the respective on-board electrical system 100 and also for example to a battery bank 2, which can be provided as the main power source for the on-board system 1 or which alternatively can also be provided as a buffer device, to be supplied with electrical power in such a way that the state of charge of the battery bank 2 can be influenced and in particular the battery bank can be charged. In other words, the device 4 for providing electrical power can be used for charging the battery bank 2, but it can also be used for direct supply of the individual consuming device 10, 12, or for a combined supply of individual consuming devices 10, 12 with simultaneous charging of the battery bank 2.

In FIG. 1 the on-board electrical system 100 is likewise illustrated in a very schematic manner. An electric motor 10, which can be provided for the boat as main drive and by means of which the boat can be powered, is provided in the on-board electrical system 100. However, the electric motor 10 also symbolically represents any other electric motor on board the boat, for example for an electric motor of an electrical winch on a sailing boat or for an electric motor of a capstan or of a davit, etc.

Furthermore, a further consuming device in the form of the light bulb 12, which correspondingly draws electrical power from the on-board electrical system 100, is illustrated schematically in the on-board electrical system 100. In this case the schematically depicted light bulb 12 symbolically represents all the other electrical consuming devices inside the boat. Electrical consuming devices for example in the form of the boat lighting, the position lamps, communication equipment, navigation equipment, data processing equipment, or the general control or regulation of the functions of the boat in the on-board electrical system 100 can be present in the boat. Furthermore, electrical consuming devices in the form of comfort features such as for example climate control systems, cooling devices, cooking appliances, etc., can be present in the on-board electrical system 100. This listing should not be regarded as definitive, but the illustrated consuming devices inside the on-board electrical system 100, which are shown here schematically in the form of the electric motor 10 and the light bulb 12, can represent any other consuming devices inside the on-board electrical system 100.

The consuming devices inside the on-board electrical system 100 can have a substantially constant power requirement, such as for example position lamps on a boat, which are operated constantly over a relatively long time period. However, the consuming devices can also have widely fluctuating power requirements. Thus, for example, depending upon the state of travel the main drive motor of a boat is operated at different power levels, switched off or even operated in recuperation mode. Accordingly the power requirement of such a consuming device on the on-board electrical system 100 fluctuates greatly.

Furthermore, the on-board system 1 comprises a battery bank 2, which provides the on-board electrical system 100 with electrical power. The battery bank 2 can either be provided as a buffer battery, which buffers fluctuations in the power required by the consuming device 10, 12 or the peaks thereof and accordingly is charged in the event of a power surplus. However, the battery bank 2 is usually provided as the main power storage for the on-board electrical system 100. In other words, the on-board system 1 is provided as a system which for the majority of its operating period functions with the power supply by means of the battery bank 2.

In the case of electrically powered boats, for example, the battery bank 2 is usually provided as the main power source. Thus in the case of electrically powered boats it is regarded as a preferred mode of operation that the boat moves about merely on the basis of the power stored in the battery bank 2. In this way a very low-noise and simultaneously at least locally emission-free operation of the boat is possible. Accordingly the battery bank 2 is dimensioned so that the electric motor 10, which serves as the main drive of the boat, can be supplied with power exclusively by the battery bank 2 over a sufficiently long time period.

The battery bank 2 can preferably be charged by means of a shore connection.

Furthermore, FIG. 1 shows schematically a switching device 3 of the on-board electrical system 100 which makes it possible to distribute and to switch the power provided by the battery bank 2 via the intermediate circuit 120 appropriately to the electric motor 10 and the other end consumer devices 12. In this case the switching device 3 can also for example comprise a speed regulator which controls the flow of power to the electric motor 10. Accordingly a driver of the boat can set the required speed level for the electric motor 10 by means of a corresponding transmitter, for example a remote throttle, so that by means of the switching device 3 the required power is correspondingly delivered from the battery bank 2 to the electric motor 10 and accordingly the boat is operated at the speed level set by the driver.

In a recuperation mode of the electric motor 10 the switching device 3 can also ensure that the recovered power is again fed to the battery bank 2, in order to increase or to obtain the state of charge thereof.

Furthermore, in the exemplary embodiment of the on-board system 1 illustrated in FIG. 1 a device for providing electrical power 4 is illustrated, which provides additional electrical power to the on-board electrical system 100 and, in the illustrated exemplary embodiment, to the switching device 3.

The device 4 for providing electrical power comprises a generator 6, which in the exemplary embodiment is designed as an electronically commutated direct current generator, and a combustion engine 7, which powers the generator 6 by means of a corresponding drive shaft 72. The drive shaft 72 can be provided with a gear mechanism which converts the speed output by the combustion engine 7 to a speed required by the generator 6.

The generator 6 has a generator regulator 60, by means of which the generator 6 can be regulated on the basis of at least one set generator reference variable. Accordingly, because the generator 6 is regulated by means of the generator regulator 60, the generator 6 can be operated directly according to certain settings and in particular by means of corresponding generator reference variables and can then be operated in a substantially stable manner.

A voltage setting and/or a current setting and/or a power setting and/or a battery current setting and/or a battery voltage setting and/or a battery power setting and/or an intermediate circuit voltage setting and/or an intermediate circuit current setting and/or an intermediate circuit power setting, and/or a power setting and/or an operating point setting and/or a speed setting and/or a torque setting can be provided as a generator reference variable by means of which the generator can be regulated.

The electronically commutated direct current generator 6 can be regulated by means of a variation of the generator manipulated variable for generator torque and/or generator current and/or generator voltage and/or generator speed and/or generator power to adjust it to the respective generator reference variable.

The combustion engine 7 for its part likewise has an engine regulator 70, by means of which the combustion engine 7 can be regulated on the basis of at least one engine reference variable. Thus the combustion engine 7 can be regulated in a stable manner by the setting of the engine reference variable by means of the engine regulator 70.

A voltage setting and/or a current setting and/or a power setting and/or a battery current setting and/or a battery voltage setting and/or a battery power setting and/or an intermediate circuit voltage setting and/or an intermediate circuit current setting and/or an intermediate circuit power setting, and/or a power setting and/or an operating point setting and/or a speed setting and/or a torque setting can be provided as an engine reference variable by means of which the combustion engine can be regulated.

By means of a variation of the engine manipulated variable for fuel delivery and/or injection valve control and/or ignition timing and/or mixture composition and/or air supply and/or camshaft adjustment and/or turbocharger control, the combustion engine 7 can be adjusted to the respective engine reference variable.

In this case the engine regulator 70 has the possibility, for example as engine manipulated variable, to regulate the corresponding fuel delivery to the combustion engine 7 for example by means of a corresponding actuator or a throttle cable. If the speed measured on the output shaft 72 of the combustion engine 7 departs from speed setting set as engine reference variable, the engine regulator 70 can again produce the desired value of the speed of the combustion engine 7 correspondingly by means of a regulating intervention in the fuel delivery.

In a preferred embodiment the engine regulator 70 of the combustion engine 7 can be provided as an electronic regulator, which for example receives the current speed of the combustion engine 7 or of the generator 6 by means of a corresponding sensor signal, and regulates the fuel delivery to adjust it to the combustion engine 7 on the basis of the speed setting by means of an actuator.

However, the combustion engine 7 can also be operated by means of a substantially mechanical regulator 70 which is provided, for example, in the form of a centrifugal force regulator in which a corresponding speed setting is mechanically set. When a centrifugal force regulator is used, an engine reference variable in the form of the speed setting can be varied by setting and changing the corresponding working point of the centrifugal force regulator by means of an electromechanical, hydraulic or pneumatic actuator. Accordingly when a modified speed setting is required, the centrifugal force regulator is set by means of the actuator so that it adjusts the combustion engine 7 to the new speed setting.

The combustion engine 7 can be regulated by a speed setting and also by means of other settings as engine reference variable. In particular it is provided that the combustion engine 7 is regulated for example by means of a current setting, a voltage setting or a power setting of the on-board electrical system 100 and or of an intermediate circuit 120. In such a case, with regard to the engine regulation 70 initially attention is not necessarily paid to the generator 6 in terms of regulation, but the combustion engine 7 is regulated by means of a determination for example of the voltage in the on-board electrical system 100 so that a corresponding specified voltage is reached as engine reference variable.

In such a case the engine regulator 70 is obtained according to a voltage setting as engine reference variable, and the determined on-board voltage is compared with the voltage setting in order then for example to achieve the required specified voltage by means of a variation for example of the engine manipulated variable for fuel delivery.

The generator regulator 60 of the generator 6 makes it possible likewise to regulate the generator by means of a generator reference variable. When the generator 6 is configured as an electronically commutated direct current generator it can be regulated for example as generator manipulated variable by adjustment of the torque, the generator current and thus the corresponding excitation/torque or the speed. This generator manipulated variable can be varied so that the corresponding generator reference variable is achieved.

Accordingly the generator 6 can be regulated substantially independently of the combustion engine 7.

In a typical mode of operation the combustion engine 7 is operated by means of the engine regulator 70 at a set speed setting as engine reference variable. On the other hand, the generator 6 is for example operated at a voltage which is set by means of a voltage setting as generator reference variable and which the generator 6 maintains. Accordingly, the generator regulator 60 varies the generator manipulated variables so that the generator reference variable is achieved. Thus the settings required by the on-board electrical system 100 and, in particular in the said case, the voltage setting can be achieved.

Thus both the combustion engine 7 and also the generator 6 are in each case operated optimally for the most part, so that on the one hand a further increased energy efficiency can be achieved, and on the other hand the quality of the power supply of the on-board electrical system 100 is further increased. Thus the generator 6 and the combustion engine 7 can also be regulated largely independently of one another.

A higher-level controller 8 is provided, which sets the reference variables corresponding to both the generator regulator 60 and also the engine regulator 70. Accordingly the control device 8 supplies the engine regulator 70 with an engine reference variable such as for example a speed setting, which is then regulated independently and autonomously by the engine regulator 70 by means of a variation of the corresponding engine manipulated variables.

Furthermore, the control device 8 supplies the generator regulator 60 with a generator reference variable for example in the form of a voltage setting, a current setting or a power setting for the on-board electrical system 100 and the generator regulator 60 then regulates this setting likewise independently and autonomously by means of the variation of the corresponding generator manipulated variable.

The control device 8 defines the corresponding generator reference variables and engine reference variables on the basis of the respective requirements from the on-board electrical system 100 having regard to the knowledge of the on-board system 1. For example, by means of a determination of the current or of the voltage or of the required power in the intermediate circuit between the generator 6 and the switching device 3 or in the circuits supplying the respective consuming devices 10, 12 the control device 8 can deduce a corresponding current setting, voltage setting or power setting.

On the basis of stored data, tables, parameters and/or characteristics stored in a database 80, the control device 8 can also specify the control variable and in particular the value of a reference variable at which the device 4 can be operated suitably and in particular especially efficiently.

For example, engine characteristics of the combustion engine 7 are stored in the database 80 of the control device 8. Accordingly on the basis of the characteristics known from the database 80 the control device 8 can specify the operating point at which the combustion engine 7 should be operated and can then supply the corresponding setting as an engine reference variable to the regulator 70 of the combustion engine 7.

For example, the combustion engine 7 can be instructed by the control device 8 to be operated at its maximum efficiency. The control device 8 will then supply a corresponding speed setting as engine reference variable to the regulator 70 of the combustion engine 7 so that the combustion engine 7 is accordingly operated at its maximum efficiency.

However, if the control device 8 recognizes that a higher power output is necessary, it can also instruct the regulator 70 of the combustion engine 7 that the combustion engine 7 is to be operated at its maximum power, so that the regulator 70 obtains from the control device 8 as engine reference variable a speed setting which usually lies above the speed setting which operates the combustion engine 7 at its maximum efficiency.

In this case, however, the control device 8 can take into consideration the fact that at the speed of maximum efficiency a specific power range can be covered. Therefore the increase in the power requirement does not automatically mean that the speed of the highest efficiency must be relinquished. The speed setting can also be increased by the control device 8 only when the power requirement exceeds the maximum power achievable at this speed.

The corresponding settings on the generator 6 or the generator regulator 60 of the generator 6 can likewise be set either on the basis of the characteristics stored in the database 80 or on the basis of the respectively set measurements or monitoring of the intermediate circuit 120 for battery bank 2 or the respective consuming device circuit.

For example, the control device 8 can determine from the on-board electrical system 100 that a specific current, a specific power or a specific voltage is required. Accordingly this is communicated as a generator reference variable to the generator regulator 60, which then for its part moves the generator 6 by means of the corresponding generator manipulated variable into this working point, for example by specifying a torque or a generator current which is then adjusted autonomously by means of the generator regulator 60.

If a charging operation for the battery bank 2 is provided, the control device 8 can also instruct a corresponding charging curve of the generator regulator 60 in such a way that the device 4 functions directly as an active battery charger. In other words, the control device 8 can pass through an optimal charging curve or an efficient charging curve for providing the corresponding charging capacity for the battery bank 2.

In this case, for example, in a main charging phase the battery bank 2 can be supplied with a maximum current, so that the generator reference variable supplied by the control device 8 to the generator regulator 60 is a maximum current setting which is then regulated autonomously by the generator 6 by means of the generator regulator 60.

If the control device 8 then detects that a target charging voltage has been reached in the battery bank 2, then by supplying a new generator reference variable, in this case a specified voltage at the level of the target charging voltage, the operation of the generator 6 is adjusted to the voltage which is then maintained by means of the generator regulator 60. Accordingly the generator 6 is then operated to a voltage setting so that in the recharging range the battery bank 2 can likewise be optimally charged.

In this way it is possible to regulate both the combustion engine 7 and also the generator 6 in a wide range independently of one another, and nevertheless to use and reliably provide the required electrical power in the on-board electrical system 100 either for supplying consuming devices or for charging the battery bank.

The charging operation for the battery bank 2 can also be superimposed on the rest of the power requirement of the on-board electrical system 100. In other words, by means of the control device 8 a charging curve just described above by way of example can be superimposed on the already existing power requirement inside the on-board electrical system 100. Thus in spite of the power consumption of the different consuming devices the battery bank 2 can be reliably charged by means of the generator 6. The excess power in each case which is not drawn by the consuming devices is then fed accordingly to the battery bank 2.

Depending upon the dimensioning of the device 4 and depending upon the design of the combustion engine 7 an operation of the combustion engine 7 is advantageous in which the combustion engine 7 is supplied by means of the engine regulator 70 with an engine reference variable which is for example a current setting, a voltage setting or a power setting of the on-board electrical system 100. The corresponding monitoring parameters can be supplied to the engine regulator 70 either directly or via the control device 8.

Accordingly the combustion engine 7 is then regulated by means of the engine regulator 70 so that in the on-board electrical system 100 for example the required current setting, voltage setting, or power setting is achieved. Simultaneously the generator 6 is preferably operated by means of the generator regulator 60 so that it keeps the speed substantially constant.

In this way, even in the case of combustion engines 7 of rather simpler design in terms of regulation, but which then provide a corresponding cost advantage, by means of the control device 8 it is possible, via the regulation of the combustion engine 7 by means of the engine regulator 70, for example, to make an adjustment more simply to a voltage setting, since the generator 6 already maintains the speed and accordingly the power required in each case is provided by means of a dynamic regulation of the corresponding fuel delivery to the combustion engine 7.

Furthermore, the device 4 can be designed particularly efficiently in that the generator 6 also serves simultaneously as starter motor for the combustion engine 7. Accordingly, by corresponding driving of the combustion engine 7, the engine can be brought to a speed which allows reliable ignition. After this the generator 6 is then switched over into the generator mode.

Figure 2:
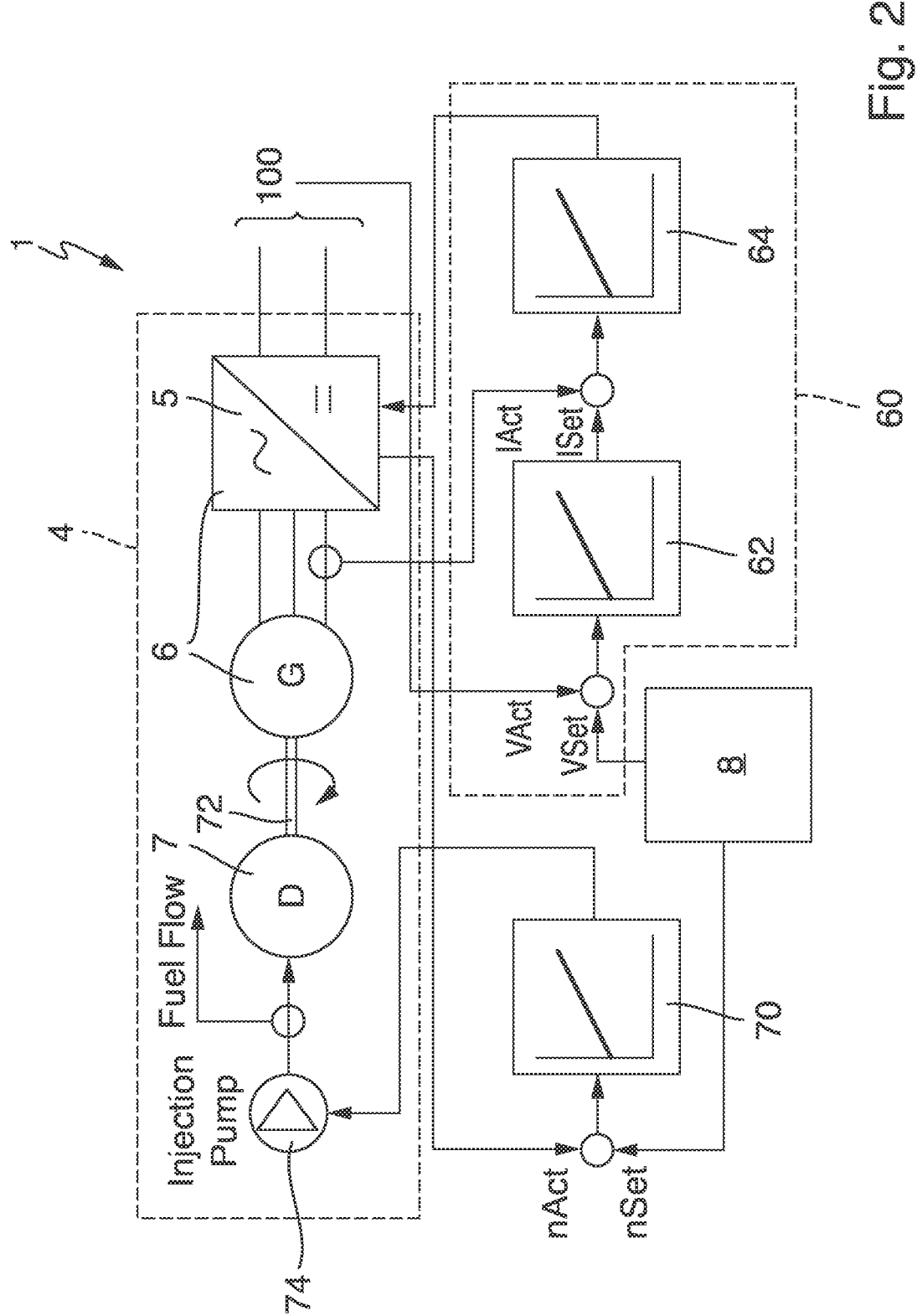
FIG. 2 shows a schematic representation of a further on-board system having a layout in which a voltage setting is provided as a generator reference variable.

In FIG. 2 a further embodiment of the on-board system 1 is shown, in which the device 4 is designed to provide electrical power with a combustion engine 7, which drives a generator 6 by means of a drive shaft 72. The power of the combustion engine 7 is varied by means of a fuel pump 74 in order to provide regulation of an engine manipulated variable.

A rectifier 5 is integrated with the generator 6, so that the on-board electrical system 100 is supplied with direct current from the generator 6.

In the exemplary embodiment shown in FIG. 2 a generator regulator 60 is provided in which in a first regulating stage 62 the actual voltage VAkt is regulated by the voltage setting VSet provided as generator reference variable. Thus a generator manipulated variable in the form of the generator current is provided in order to influence the generator torque correspondingly.

In a second regulating stage 64 of the generator regulator 60, by means of the generator reference variable of the generator current ISet the generator torque is compared to the generator current IAkt present in the generator 6 present and accordingly a manipulated variable for the generator current is provided. In this way the torque of the generator 6 can be provided by means of the generator current.

The control device 8 specifies the generator reference variable of the generator voltage VSet. Furthermore, for the combustion engine the control device 8 specifies a speed nSet which can be correspondingly adjusted by means of the engine regulator 70 so that the engine regulator 70 can adjust the speed of the combustion engine 7 correspondingly by means of the variation of the engine manipulated variable of the injection pump 74. The actual speed of the combustion engine 7 is delivered to the engine regulator 70 as nAkt.

Accordingly in the control device 8 on the basis of the voltage control and taking account, for example, of a fixed multiplier or a corresponding value table or a corresponding characteristic, a corresponding engine speed is provided as engine reference variable, which is then used by means of the engine regulator 70 in order to regulate the combustion engine 7.

Thus in this exemplary embodiment the control device 8 supplies the generator regulator 60 with a voltage setting and supplies the engine regulator 70 with a speed setting.

Accordingly the generator 6 is operated according to the generator reference variable, in this case the specified voltage to be achieved in the on-board electrical system 100, wherein the generator 6 is then regulated with respect to its manipulated variable for generator current, which simultaneously also influences the generator torque.

Thus a substantially independent regulation of the combustion engine 7 and of the generator 6 takes place, so that in an optimization process a particularly efficient operation can be achieved, and the conversion of fuel into electrical power for the respective operational requirements of the on-board system 1 can be carried out particularly efficiently.

In FIG. 3 a further layout for the on-board system 1 is shown. In this case by means of the control device 8 of the generator regulator 60 a generator speed nSet is supplied, which in a first regulating stage 62 sets a generator torque by means of the generator reference variable of the generator current ISet, which in a second regulating stage 64 is compared with the generator current IAkt present in the generator 6 and accordingly a manipulated variable for the generator current is provided.

The combustion engine 7 is adjusted to its manipulated variable on the injection pump 74 by means of the engine regulator 70 so that a voltage VSet set by means of the control device 8 is adjusted relative to the actual voltage VAkt in the on-board electrical system 100.

Accordingly the torque of the generator 6 is determined by means of the generator regulator 60 on the basis of the actual current speed of the generator 6, for example on the basis of a fixed factor, a look-up table or a characteristic, which sets the speed in relation with the torque of the generator. Accordingly the combustion engine 7 is controlled so that the required voltage is maintained in the on-board electrical system 100.

Thus in this exemplary embodiment the control device 8 supplies the generator regulator 60 with a speed setting and supplies the engine regulator 70 with a voltage setting.

Accordingly the speed of the combustion engine 7 can be set in wide ranges independently of the respective regulation tasks of the generator 6, since the generator 6 is controlled independently by means of the generator regulator 60. This makes it possible to operate the combustion engine 7 efficiently.

If applicable, all individual features which are set out in the exemplary embodiments can be combined with one another and/or exchanged for one another, without departing from the scope of the invention

LIST OF REFERENCE SIGNS

1 on-board system
10 electric motor
12 lamp
100 on-board electrical system
120 intermediate circuit
2 battery bank
3 switching device
4 device for providing electrical power
5 rectifier
6 generator
60 generator regulator
7 combustion engine
70 engine regulator
72 drive shaft
74 injection pump
8 control device
80 database The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A device, comprising:
   a combustion engine having an engine regulator for regulating the combustion engine;
   a direct current generator, which is coupled to and operated by the combustion engine, and which has a generator regulator for regulating the direct current generator, wherein the direct current generator provides electric power to an electrical consuming device of and/or charges a battery of an on-board electrical system of an electric-motor powered boat; and
   a control device configured to set an engine reference variable for the engine regulator and a generator reference variable for the generator regulator, wherein the engine reference variable and the generator reference variable are set independent of one another,
   wherein the control device is configured to set, for a specific power range, the engine reference variable in the form of a constant speed setting on the basis of a power demand in the on-board electrical system and to increase the constant speed setting when the specific power range is exceeded,
   wherein the control device is configured to set a generator reference variable in the form of a voltage setting, current setting or power setting on the basis of the power demand in the on-board electrical system at a constant speed setting, and
   wherein the control device provides the engine regulator with the constant speed setting as the engine reference variable and provides the generator regulator with the voltage setting, current setting or power setting as the generator reference.

2. The device according to claim 1, wherein:
   the direct current generator is an electronically commutated direct current generator, and
   the generator regulator is configured to adjust the direct current generator by means of a variation of the generator manipulated variable for generator torque and/or generator current and/or generator voltage and/or generator speed and/or generator power on the respective generator reference variable.

3. The device according to claim 1, wherein:
the direct current generator is an electronically commutated direct current generator, and
the generator regulator is configured to adjust the direct current generator by means of a variation of the generator manipulated variable for generator torque and/or generator current and/or generator voltage and/or generator speed and/or generator power on the respective generator reference variable.

4. The device according to claim 1, wherein by means of a variation of an engine manipulated variable for fuel delivery and/or injection valve control and/or ignition timing and/or mixture composition and/or air supply and/or camshaft adjustment and/or turbocharger control, the engine regulator of the combustion engine is adjusted to the respective engine reference variable.

5. The device according to claim 1, wherein by means of a variation of an engine manipulated variable for fuel delivery and/or injection valve control and/or ignition timing and/or mixture composition and/or air supply and/or camshaft adjustment and/or turbocharger control, the engine regulator of the combustion engine is adjusted to the respective engine reference variable.

6. The device according to claim 1, wherein by means of a variation of an engine manipulated variable for fuel delivery and/or injection valve control and/or ignition timing and/or mixture composition and/or air supply and/or camshaft adjustment and/or turbocharger control, the engine regulator of the combustion engine is adjusted to the respective engine reference variable.

7. The device according to claim 1, wherein the generator regulator and/or the engine regulator of the combustion engine and/or the control device are integrated in a central controller.

8. The device according to claim 1, wherein:
the control device comprises characteristics and/or values stored in a database for the engine reference variable and/or the generator reference variable; and
the control device supplies the engine regulator and/or the generator regulator with
a value of the engine reference variable for operating the combustion engine at maximum efficiency or at maximum power, and/or
a value of the generator reference variable according to a characteristic which sets a battery charging curve.

9. The device according to claim 1, wherein:
the control device comprises characteristics and/or values stored in a database for the engine reference variable and/or the generator reference variable; and
the control device supplies the engine regulator and/or the generator regulator with
a value of the engine reference variable for operating the combustion engine at maximum efficiency or at maximum power, and/or
a value of the generator reference variable according to a characteristic which sets a battery charging curve.

10. The device according to claim 1, wherein:
the control device comprises characteristics and/or values stored in a database for the engine reference variable and/or the generator reference variable; and
the control device supplies the engine regulator and/or the generator regulator with
a value of the engine reference variable for operating the combustion engine at maximum efficiency or at maximum power, and/or
a value of the generator reference variable according to a characteristic which sets a battery charging curve.

11. The device according to claim 1, wherein the combustion engine has an electronic engine controller, and the engine regulator carries out the regulation of the combustion engine by means of the electronic engine controller.

12. The device according to claim 1, wherein the combustion engine has a mechanical speed regulator as the engine regulator and the mechanical speed regulator receives from the control device an engine reference variable in the form of a speed setting by means of a mechanical and/or pneumatic and/or hydraulic actuator for adjustment of the mechanical speed regulator.

13. The device according to claim 1, wherein the combustion engine has a mechanical speed regulator as the engine regulator and the mechanical speed regulator receives from the control device an engine reference variable in the form of a speed setting by means of a mechanical and/or pneumatic and/or hydraulic actuator for adjustment of the mechanical speed regulator.

14. The device according to claim 1, wherein the combustion engine has a mechanical speed regulator as the engine regulator and the mechanical speed regulator receives from the control device an engine reference variable in the form of a speed setting by means of a mechanical and/or pneumatic and/or hydraulic actuator for adjustment of the mechanical speed regulator.

15. The device according to claim 1,
wherein the direct current generator is provided as starter motor for the combustion engine, and
wherein, as the generator reference variable, a speed setting is supplied to the generator regulator, and
wherein, after starting the combustion engine, the generator reference variable is retained.

16. The device according to claim 1,
wherein the direct current generator is provided as starter motor for the combustion engine, and
wherein, as the generator reference variable, a speed setting is supplied to the generator regulator, and
wherein, after starting the combustion engine, the generator reference variable is retained.

17. The device according to claim 1,
wherein the direct current generator is provided as starter motor for the combustion engine, and
wherein, as the generator reference variable, a speed setting is supplied to the generator regulator, and
wherein, after starting the combustion engine, the generator reference variable is retained.

* * * * *